(12) United States Patent
Phipps et al.

(10) Patent No.: US 9,612,172 B2
(45) Date of Patent: Apr. 4, 2017

(54) LOAD-INDICATING DEVICE

(75) Inventors: Maria Jane Phipps, Wombourne (GB); Stan Ceney, Wombourne (GB)

(73) Assignee: TENSCON LIMITED, Wolverhampton (GB)

( * ) Notice: Subject to any disclaimer, the term of this patent is extended or adjusted under 35 U.S.C. 154(b) by 32 days.

(21) Appl. No.: 14/241,195

(22) PCT Filed: Aug. 29, 2012

(86) PCT No.: PCT/GB2012/052114
§ 371 (c)(1),
(2), (4) Date: Jun. 16, 2014

(87) PCT Pub. No.: WO2013/030567
PCT Pub. Date: Mar. 7, 2013

(65) Prior Publication Data
US 2014/0283624 A1    Sep. 25, 2014

(30) Foreign Application Priority Data

Aug. 31, 2011    (GB) .................................. 1115040.6

(51) Int. Cl.
*G01L 5/00*    (2006.01)
*F16B 31/02*    (2006.01)

(52) U.S. Cl.
CPC ............. *G01L 5/00* (2013.01); *F16B 31/028* (2013.01); *G01L 5/0004* (2013.01); *G01L 5/0038* (2013.01)

(58) Field of Classification Search
CPC .......................................... B60R 2021/01516
USPC .................................................. 73/862.381
See application file for complete search history.

(56) References Cited

U.S. PATENT DOCUMENTS

| 3,306,154 | A | | 2/1967 | Bailey | |
|---|---|---|---|---|---|
| 4,483,648 | A | | 11/1984 | Trungold | |
| 4,630,490 | A | * | 12/1986 | Malicki | G01L 1/22 338/5 |
| 4,823,606 | A | * | 4/1989 | Malicki | G01L 5/24 411/14 |
| 4,909,685 | A | * | 3/1990 | Hirst | G01L 5/24 411/14 |
| 5,291,789 | A | * | 3/1994 | Walton | F16B 31/025 73/761 |
| 5,584,627 | A | * | 12/1996 | Ceney | F16B 31/025 116/DIG. 34 |
| 5,668,323 | A | * | 9/1997 | Waxman | G01L 5/24 411/14 |

(Continued)

FOREIGN PATENT DOCUMENTS

GB    2306601 A    5/1997

*Primary Examiner* — Lisa Caputo
*Assistant Examiner* — Octavia Hollington
(74) *Attorney, Agent, or Firm* — Rathe Lindenbaum LLP

(57) ABSTRACT

The present invention provides a load-indicating device for use with structural assemblies that have fastening components such as nuts and bolts. The load-indicating device comprising a washer having a tubular body defining a bore extending therethrough, the body comprising at least one hole extending at least partially through the body; and a probe configured to be disposed within the at least one hole and operable to provide an indication of the compression on the washer, such that, in use, the washer deflects to compress the hole against the probe when the load on the washer reaches a predetermined tension.

19 Claims, 11 Drawing Sheets

(56) References Cited

U.S. PATENT DOCUMENTS

Figure 1:
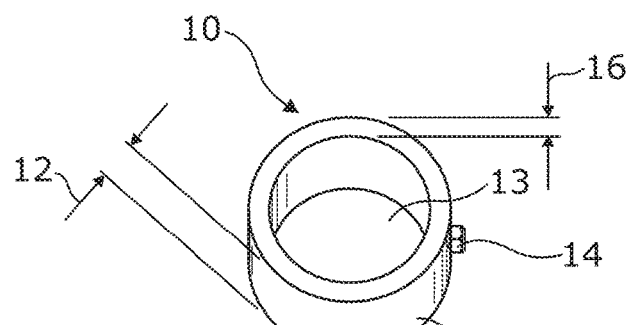

| | | | | |
|---|---|---|---|---|
| 6,204,771 | B1 * | 3/2001 | Ceney | F16B 31/025 |
| | | | | 250/559.19 |
| 7,412,898 | B1 * | 8/2008 | Smith | G01L 5/24 |
| | | | | 73/761 |
| 8,024,979 | B2 * | 9/2011 | Clarke | F16B 31/025 |
| | | | | 73/760 |
| 9,046,433 | B2 * | 6/2015 | Hsieh | F16B 31/02 |
| 2015/0337884 | A1 * | 11/2015 | Ceney | F16B 31/02 |
| | | | | 348/82 |

* cited by examiner

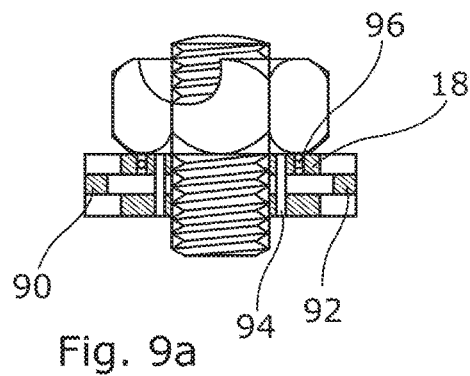
Fig. 9a
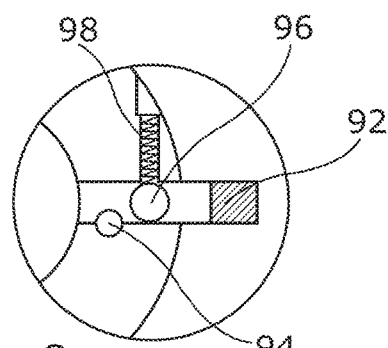
Fig. 9c
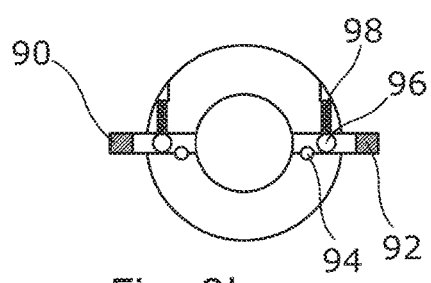
Fig. 9b
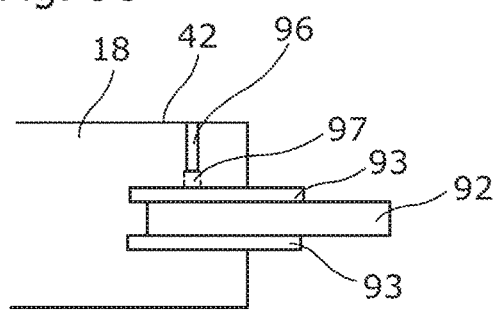
Fig. 9d
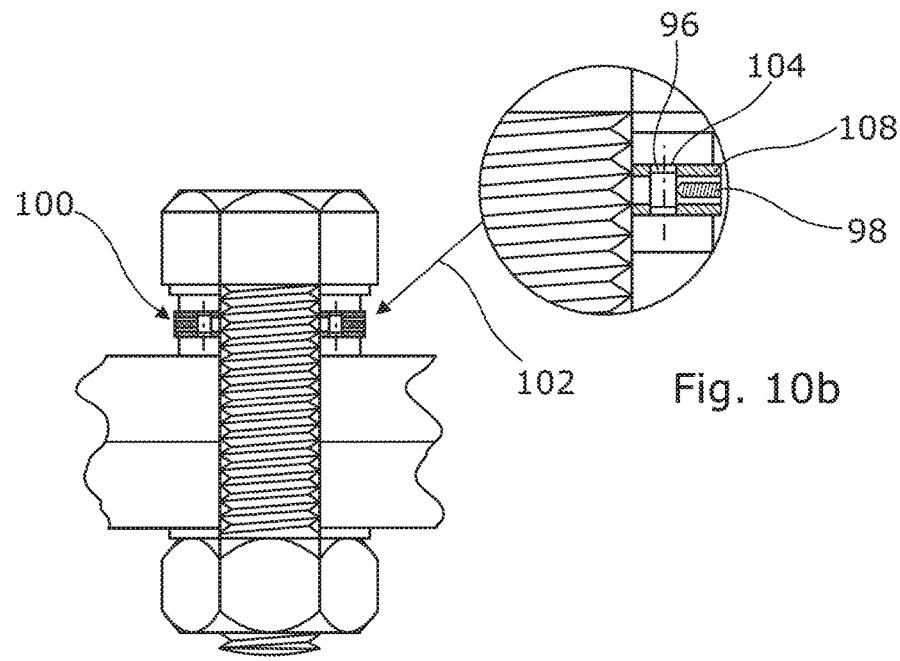
Fig. 10a
Fig. 10b

LOAD-INDICATING DEVICE

The present invention relates to a load-indicating device and particularly to a load-indicating washer for providing an indication of a predetermined tension between fastening components.

It is commonly known that if fastening components, such as nuts and bolts etc. are not correctly tensioned or secured together with the correct compressive force or load, then those components are likely to eventually fail or come apart or otherwise experience some form of mechanical fatigue. Accordingly, there are therefore numerous mechanical problems that may potentially result if a structural assembly comprising such fastening components is either under-loaded or over-loaded (i.e. under tensioned or over tensioned respectively).

Typically, an under-loaded condition will usually result in fatigue and failure of the structural components as external oscillating forces will generally be present. For example, if the oscillating forces act through a nut and bolt, with the tensioning of the nut and bolt being insufficient, the bolt will generally fail by either fracturing (due to fatigue) or otherwise will eventually become loose due to the oscillating forces.

In an over-loaded condition, the nut and bolt usually experience stresses that again may lead to failure of the fastening components. Therefore, if the tightening tension is too high, the bolt and/or nut, or their threads, will typically exceed their design load usually resulting in fracture or breakage of the components.

Accordingly it is very important to impart the correct tension, load or tightening force to fastening components to ensure the structural integrity of a mechanical assembly, which thereby increases longevity and/or safety of machines and assemblies.

A common technique for tensioning fastening components, of the likes of nuts and bolts, is to use a device such as a torque wrench to apply a tightening load. However, such devices usually have the inherent drawback of using up to approximately 90% of the effort (depending on lubrication) to overcome frictional resistance in the different fastening components. Therefore, it may prove to be very difficult to overcome the unpredictable frictional resistances with only approximately 10% of the remaining effort being available to thereby to ensure the correct tensioning load is applied to the fastening components. Consequently, this technique of tightening can be inaccurate for some tightening applications, leading to possible under-loading or over-loading of fastening components, without the operator being aware of such a condition being present.

Therefore, it is an object of the present invention to address some, if not all, of the above problems in the art, by providing an improved load-indicating device which allows reliable and consistent tensioning of fastening components.

According to a first aspect of the present invention there is a provided a load-indicating device, comprising:
- a washer having a tubular body defining a bore extending therethrough, the body comprising at least one hole extending at least partially through the body; and
- a probe configured to be disposed within the at least one hole and operable to provide an indication of the compression on the washer, such that, in use, the washer deflects to compress the hole against the probe when the load on the washer reaches a predetermined tension.

The provision of a load-indicating device having a washer and a probe disposed within at least one hole in the body of the washer, such that, in use the washer deflects under compression to compress the sides of the hole against the probes when the load reaches a predetermined tension is found to be particularly advantageous as the device is able to provide a reliable and accurate indication of the tension between two fastening components disposed either side of the body of the washer.

Therefore, the device of the present invention may be deployed in any arrangement in which two or more mechanical assemblies are to be connected by fastening components, such as nuts and bolts, in such a way that the device is disposed between the fastening components which are then tensioned (by tightening together) to a required load. In this way, the present device makes it possible to tighten fastening components to a desired or predetermined tension without the need for a torque wrench or other mechanical (tension) measuring means. Hence, an operator, such as an engineer or mechanic, can be assured that in using the device of the present invention the required tension can be achieved without concern that the fastening components have been under-loaded.

In a preferred embodiment, the probe is free to move within the hole until the load on the washer reaches the predetermined tension. Therefore, the probe may be arranged to be rotatable within the hole when the washer is not loaded or is under-loaded. Hence, an operator can manually check to determine the current loading on the washer by simply rotating the probe with his fingers (i.e. by finger pressure). During subsequent compression of the washer, for example by tightening two fastening components—one either side of the washer, the body of the washer will deflect (i.e. compress) so that the body of the washer distorts according to Hooke's Law, which forces the internal walls of the hole against the outer surface of the probe to inhibit further movement of the probe. Thus, when the operator can no longer rotate the probe, he then knows that the required tension or load on the washer has been attained.

The predetermined tension preferably corresponds to any preload within the washer material's elastic limit.

It is to be appreciated that the dimensions of the washer can be fabricated according to any desired shape or size, and that by carefully selecting the type of material and resilience of the material the washer can be optimised to deflect by any amount according to any required tension. Therefore, the load-indicating device of the present invention can be used in numerous mechanical applications and can be scaled to whatever size the particular application requires.

In particularly preferred embodiments, the probe may take the form of an elongate pin, and most preferably a close tolerance pin. By 'close tolerance' we mean that the pin has a diameter closely matched to the size of the hole. The pin may be permanently attached to the washer or in other embodiments may be removable when the washer is not in use. However, it is to be understood that any form of probe may be used in conjunction with the present invention depending on the particular application. Indeed, in some embodiments, the probe may be manufactured from a standard cap screw.

In some embodiments, a portion of the body of the washer may have a relatively narrower diameter than the remainder of the body. Therefore, the body of the washer may comprise a circumferential recess. The function of the recess is to make the body of the washer easier to deflect, i.e. compress, which thereby improves the sensitivity and range of deflection being measured.

The body of the washer comprises upper and lower load-bearing surfaces, in that two fastening components, e.g.

a nut and a bolt, may be disposed one either side of the washer such that each abuts against a respective load-bearing surface of the washer. In this way, the applied load can be transmitted or communicated to the body of the washer via the physical contact being the washer and fastening components to thereby compress the washer between the components as the components are tightened together.

In other arrangements, the washer may be disposed between two hydraulic components, such as hydraulic cylinders, again to indicate the loading between the cylinders.

In some embodiments, the load-indicating device may be arranged such that the probe is either mechanically or electrically connected to a visual display device to provide a visual indication of the loading on the washer. Therefore, in addition or alternatively, to simply rotating the probe to determine the current loading of the washer, a visual display device may be used to indicate the load on the washer.

For example, in one embodiment, the visual display device may be a rotary gauge, clock gauge or other load measuring device that is preferably operably connected to the probe via a mechanical lever or linkage.

In an alternative embodiment, the body of the washer and the probe may form part of an electrical circuit which is configured to permit a flow of current through the circuit when the load on the washer reaches the predetermined tension. Therefore, by using suitable electrical connections to the washer and the probe an electrical circuit can be preferably closed when the load on the washer reaches the required tension.

In such an embodiment, the probe is in the form of an electrode, which is preferably electrically insulated along at least a portion of the probe's length.

The electrical circuit preferably comprises at least one light source that is operable to illuminate in response to the flow of current when the predetermined tension is attained. Therefore, the device may advantageously also provide a visual indication of the load on the washer by illuminating a light source.

The light source may be a filament bulb or more preferably a light-emitting diode (LED), which may be permanently lit or else modulated or pulsed according to any desired pattern when the required tension is reached. Of course, it is to be appreciated that any suitable light source may be used in conjunction with the present invention, and indeed any audible device may additionally or alternatively be used depending on the particular application.

In some embodiments, the electrical circuit may further comprise a plurality of light sources operable to indicate at least one of: an under-loading condition, an over-loading condition and a design loading condition. Therefore, the circuit may be arranged to provide a visual indication of whether the washer has not yet reached the required load, or has been overloaded or has exactly reached the required load.

The plurality of light sources may be disposed in some form of hand-held or portable device, which is preferably configured to be used remotely from the load-indicating device, either via a wired connection or a wireless connection.

In particularly preferred embodiments, the body of the washer may further comprise a second hole extending at least partially through the body and configured to receive a second probe. The second probe is preferably operable to provide an indication of an over-loading condition on the washer. The second hole is preferably of a larger dimension than the first hole, such that a much greater deflection of the washer is required before the second hole and second probe come into contact. In this way, by carefully selecting the sizes of the second hole and/or the second probe, an indication of an over-loading of the washer can be achieved, which occurs when too much tension has been applied to the body of the washer. In such a case, the operator would be made aware of the over-load condition, either by manually testing the rotation of the second probe by finger pressure or else by way of visual indication (e.g. LED etc.), which would require him to loosen the fastening components to prevent over tensioning of the joint or mechanical connection.

Of course, it is be understood that the washer may be fabricated to include any number of holes and probes to provide an accurate indication of the symmetrical loading of the washer and of the associated mechanical components. Therefore, the washer may have numerous holes of different tolerances to indicate differing loads when measured with respective probes.

The washer may advantageously be reused for other applications by reaming out the one or more holes in the body of the washer to the required size. Therefore, the load-indicating device can be recycled and/or retro-fit to any mechanical assembly.

The washer is preferably heat treated during fabrication to improve the performance of the washer. Moreover, the washer may also be covered with a plastic or plastics material coating, such as nylon, to prevent or inhibit corrosion of the washer over time. Of course, any suitable coating or material may be used in conjunction with the washer of the present invention depending on the particular application.

It is to be appreciated that none of the aspects or embodiments described in relation to the present invention are mutually exclusive, and therefore the features and functionality of one embodiment may be used interchangeably or additionally with the features and functionality of any other embodiment without limitation.

Figure 2:
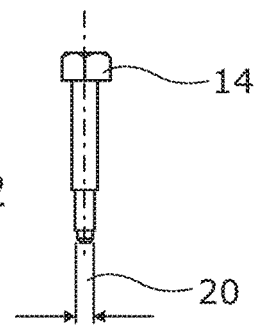
Figure 3:
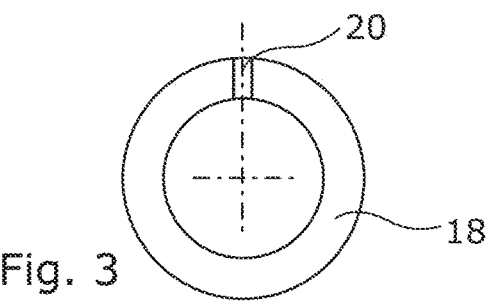
Figure 4A:
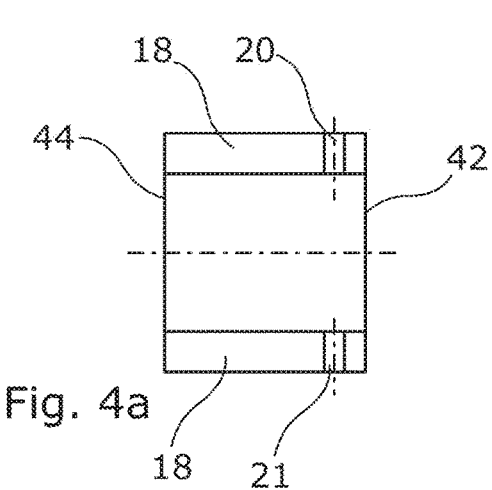
Figure 4B:
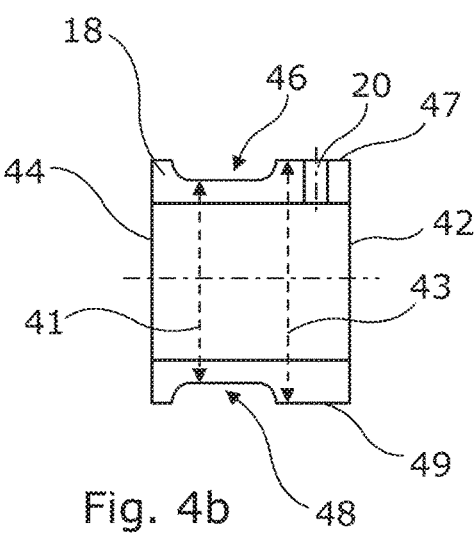
Figure 5A:
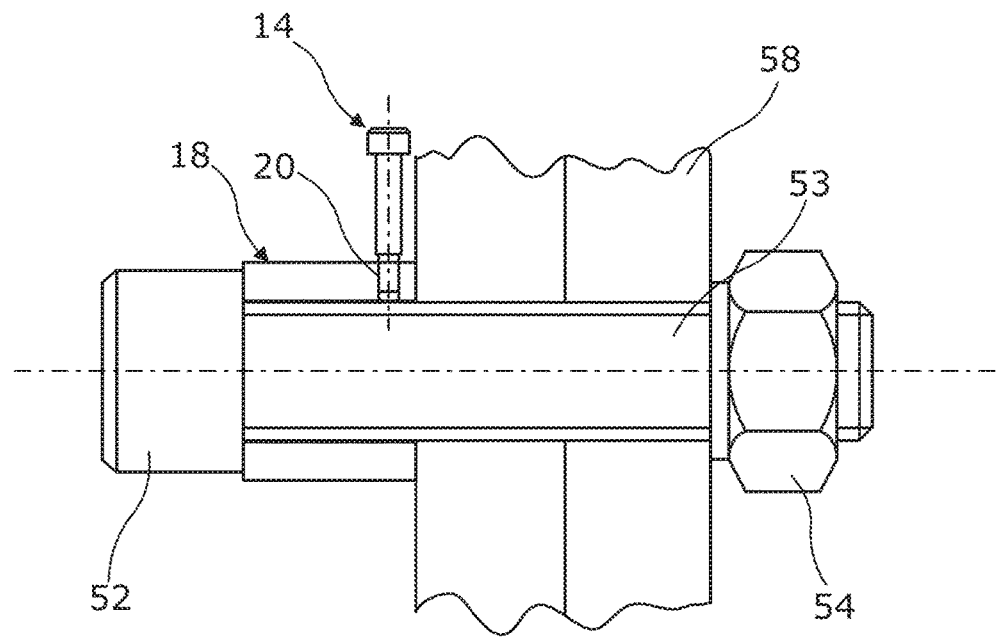
Figure 5B:
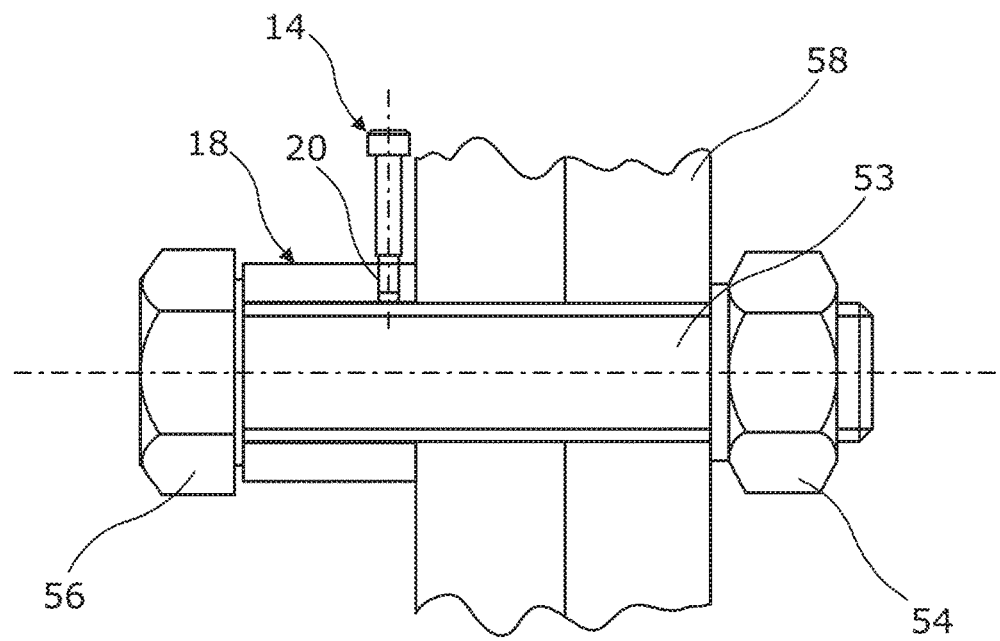
Figure 6:
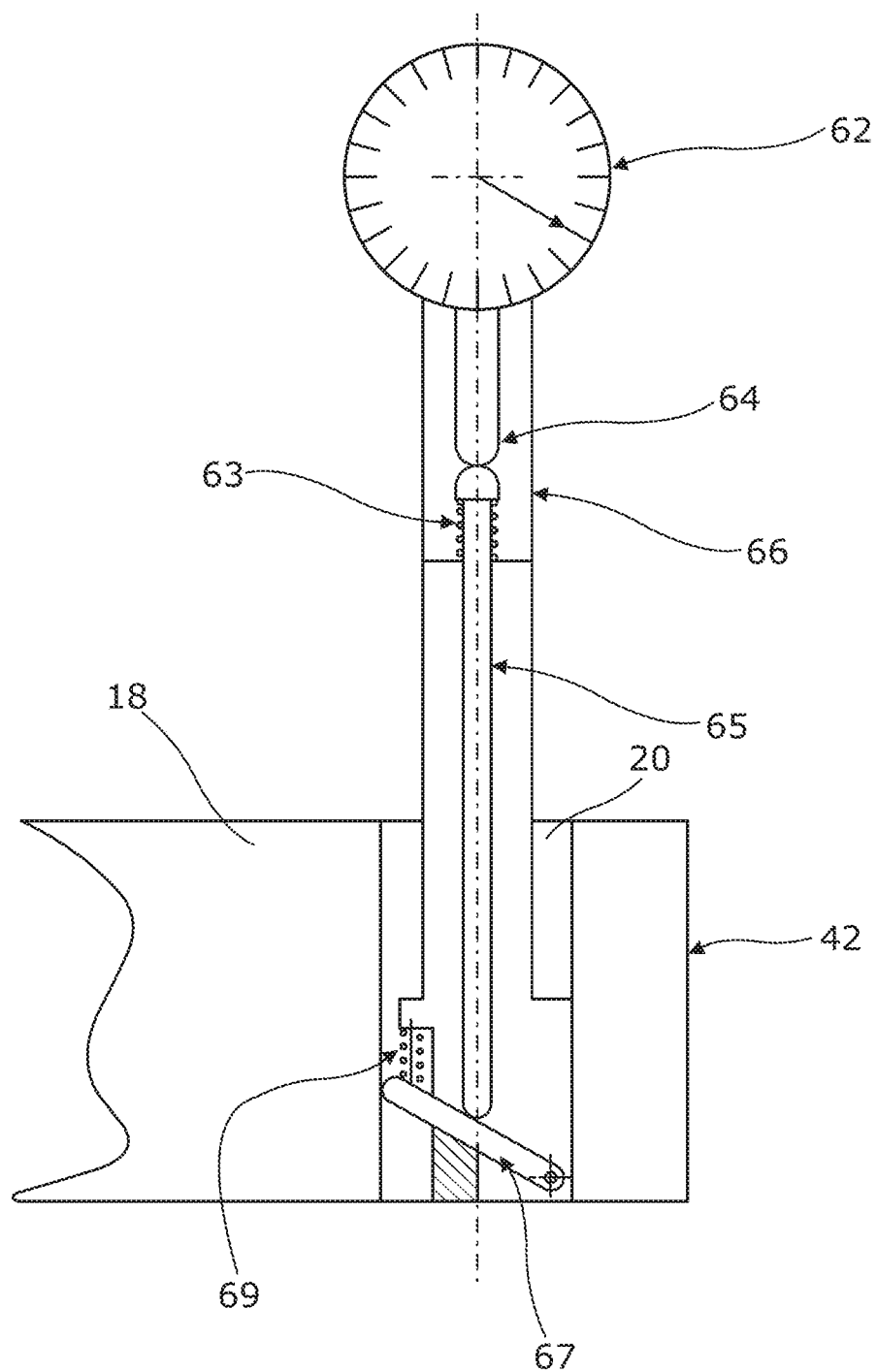
Figure 7:
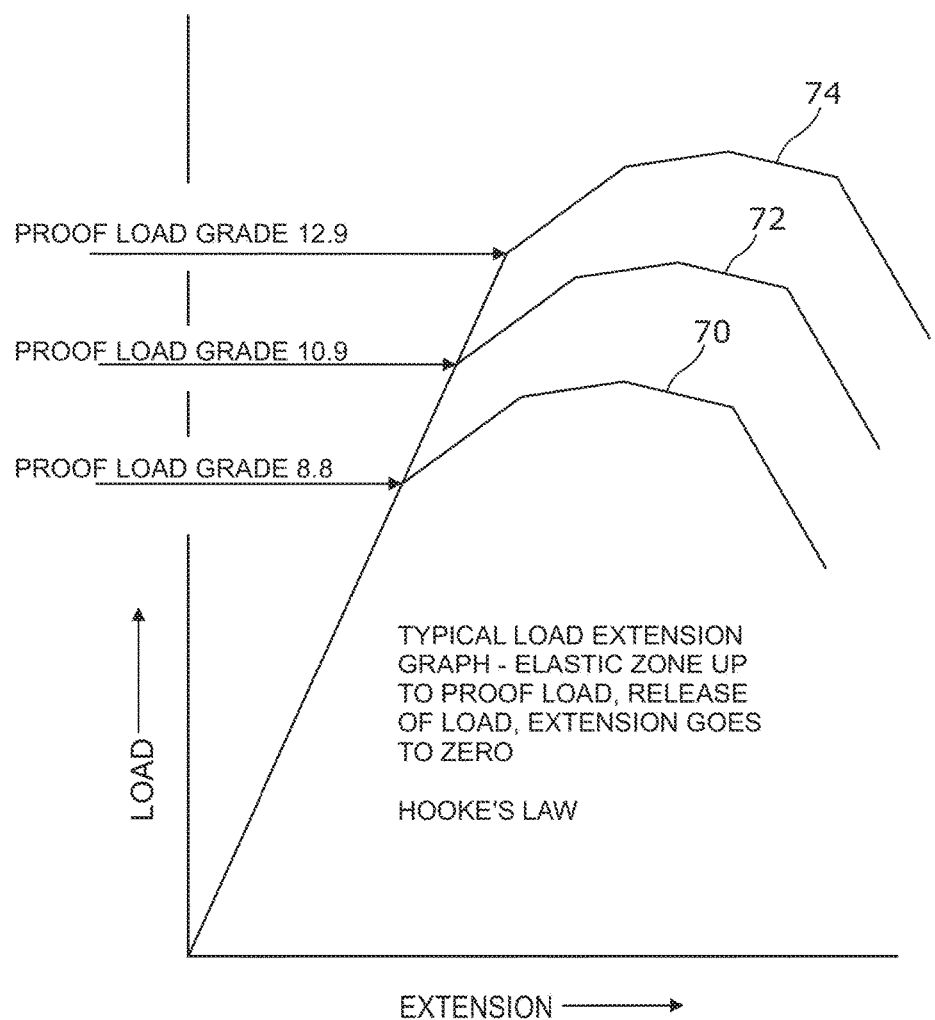
Figure 8:
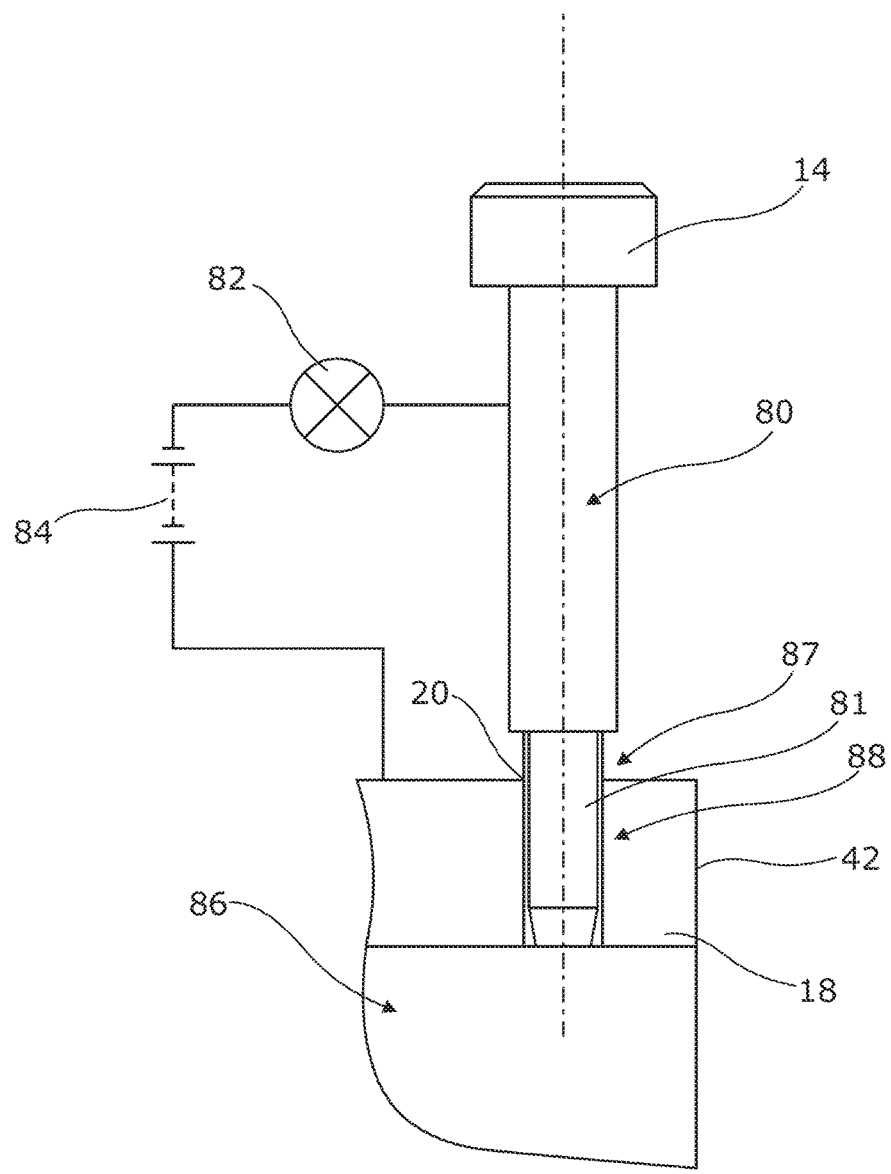
Figure 11A:
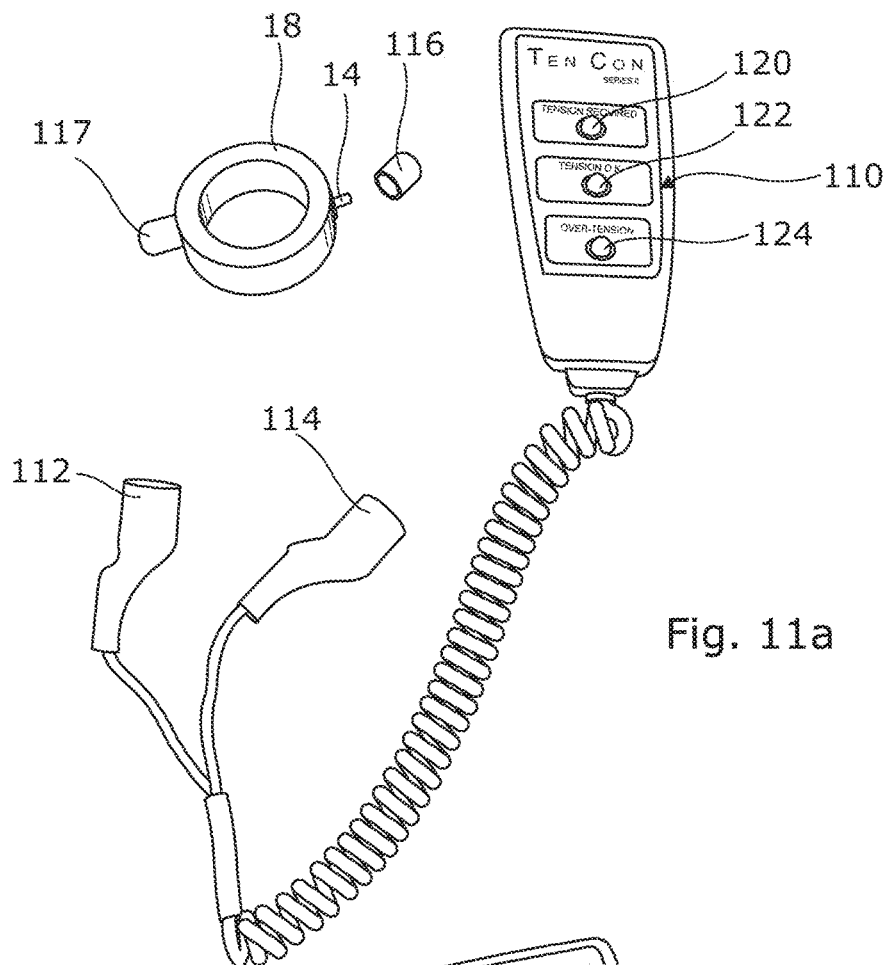
Figure 11B:
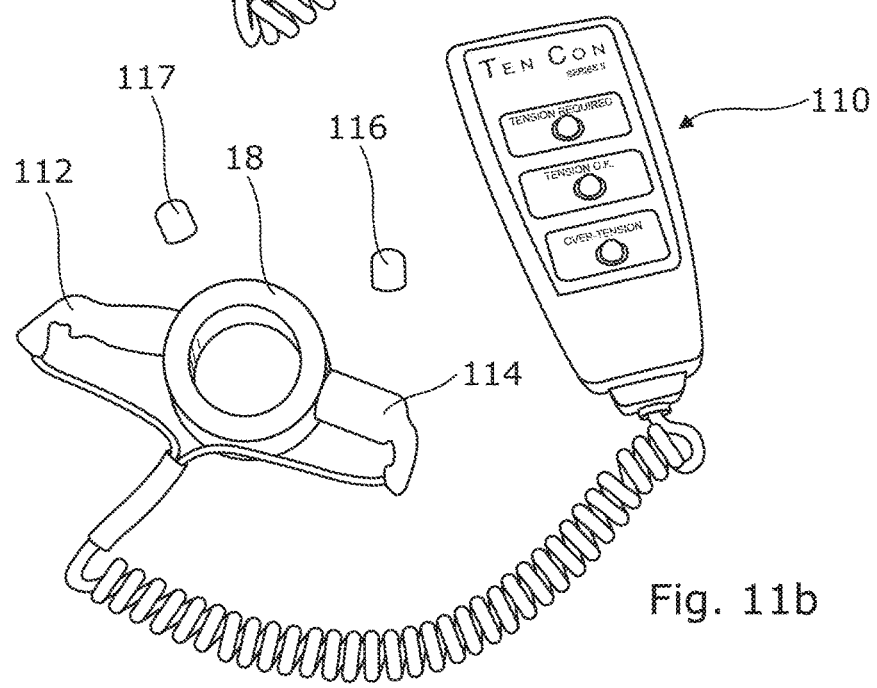
Figure 12A:
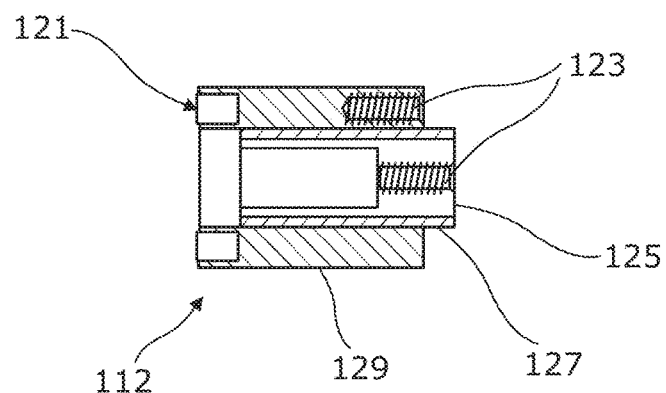
Figure 12B:
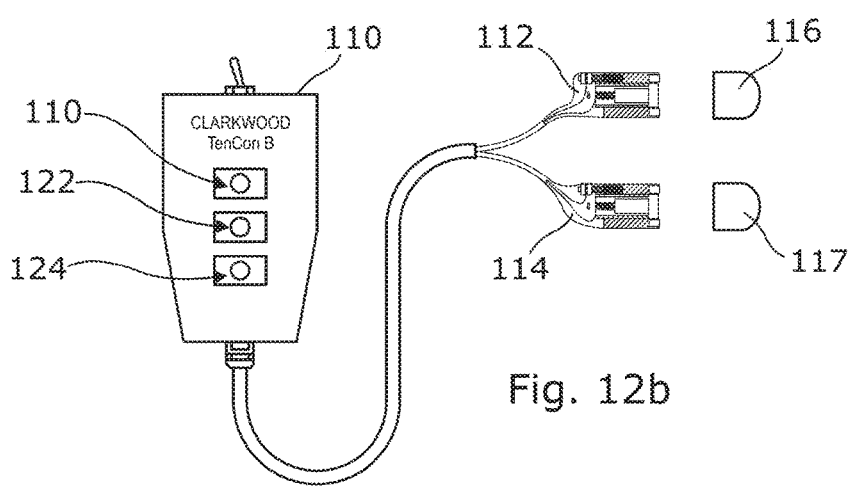
Figure 12C:
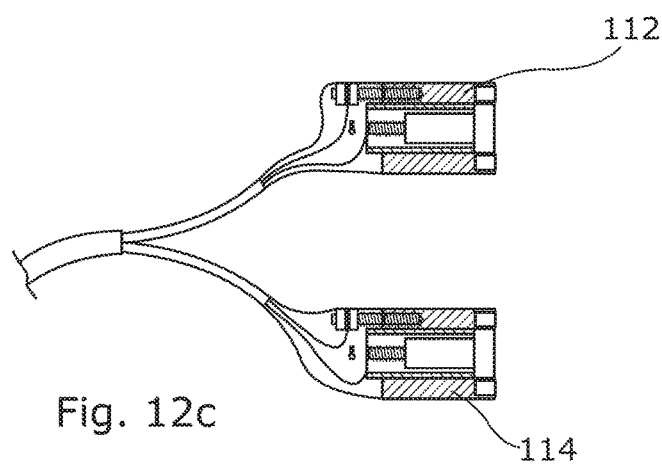
Figure 13:
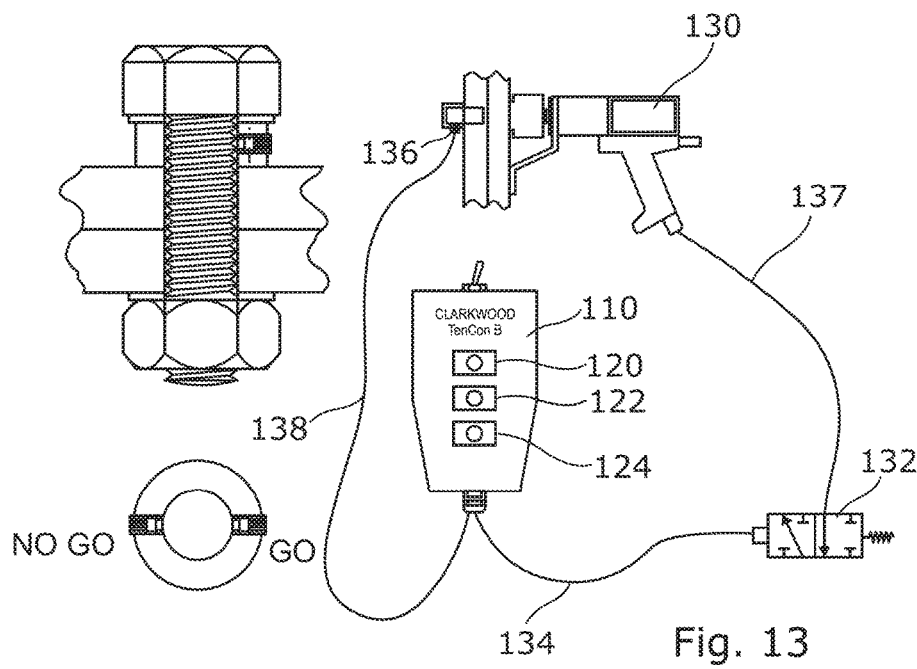
Figure 14:
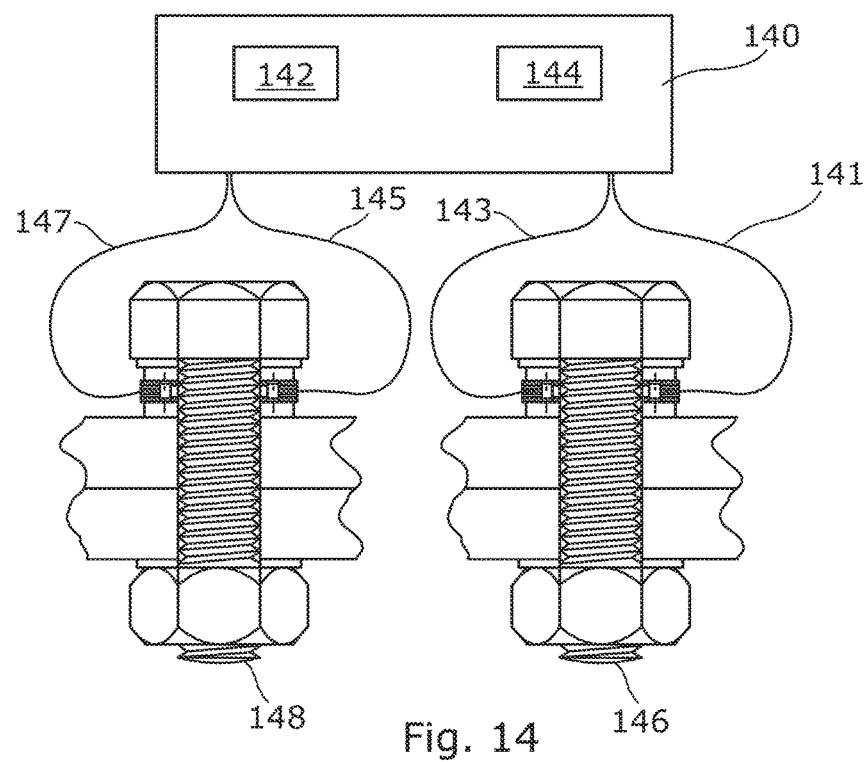
Figure 15A:
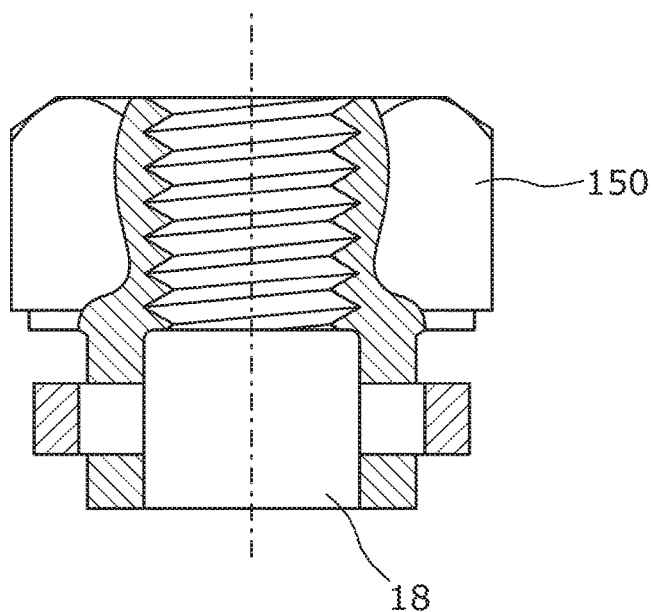
Figure 15B:
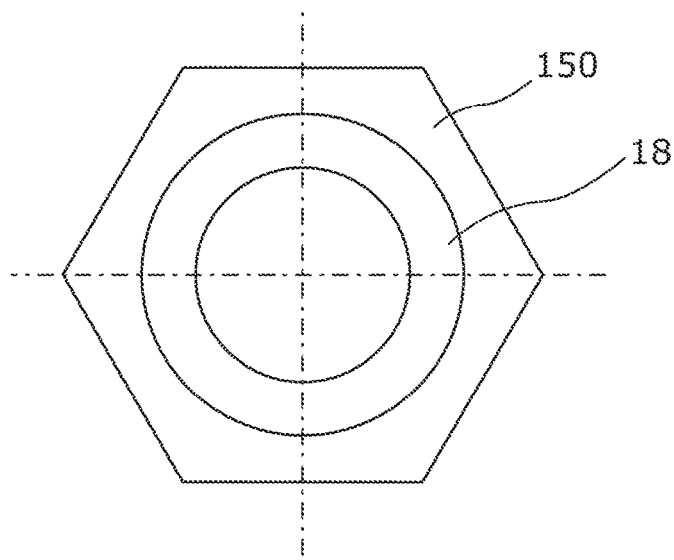

Embodiments of the present invention will now be described in detail by way of example and with reference to the accompanying drawings in which:

FIG. 1—shows a perspective view of a load-indicating device according to a preferred embodiment;

FIG. 2—shows a side view of a probe according to an embodiment of the present invention;

FIG. 3—shows a plan view of a washer according to an embodiment of the present invention;

FIG. 4a—shows a side view of a washer according to another embodiment of the present invention;

FIG. 4b—shows a side view of another washer according to a further embodiment of the present invention;

FIG. 5a—shows a load-indicating device according to a preferred embodiment in operation with a bolted joint using a cap screw & nut for tightening the assembly;

FIG. 5b—shows a load-indicating device in operation with a different bolted joint using a nut & bolt for tightening the assembly;

FIG. 6—shows another preferred embodiment of the load-indicating device of the present invention incorporating a rotary gauge;

FIG. 7—shows a plurality of Hooke's law curves of different materials for the washer of the present invention;

FIG. 8—shows another embodiment of the load-indicating device of the present invention incorporating an electrical circuit and visual indicating means;

FIGS. 9a to 9d—show various views of another embodiment of the load-indicating device of the present invention;

FIG. 10a—shows a side cross-sectional view of a further embodiment of the load-indicating device of the present invention;

FIG. 10b—shows a magnified view of a portion of the device of FIG. 10a;

FIGS. 11a & 11b—show a further embodiment of a load-indicating device of the present invention incorporating a hand-held monitor for visual indication of correct load tensioning, illustrated in unconnected and connected states, respectively;

FIG. 12a—shows a side cross-sectional view of a probe contact according to a preferred embodiment;

FIG. 12b—shows a preferred embodiment illustrating a hand-held monitor connected to a pair of contacts as shown in FIG. 12a;

FIG. 12c—shows a magnified view of the pair of contacts as shown in FIG. 12b;

FIG. 13—shows a hand-held monitor according to an alternative embodiment for automatically interrupting power to a power tool at a predetermined tension;

FIG. 14—shows a further embodiment incorporating a computer to receive signals from a plurality of load-indicating devices;

FIG. 15a—shows a side cross-sectional view of a further preferred embodiment of the load-indicating device integrated into a hexagonal nut;

FIG. 15b—shows a plan view of load-indicating device of FIG. 15a; and

Figure 16:
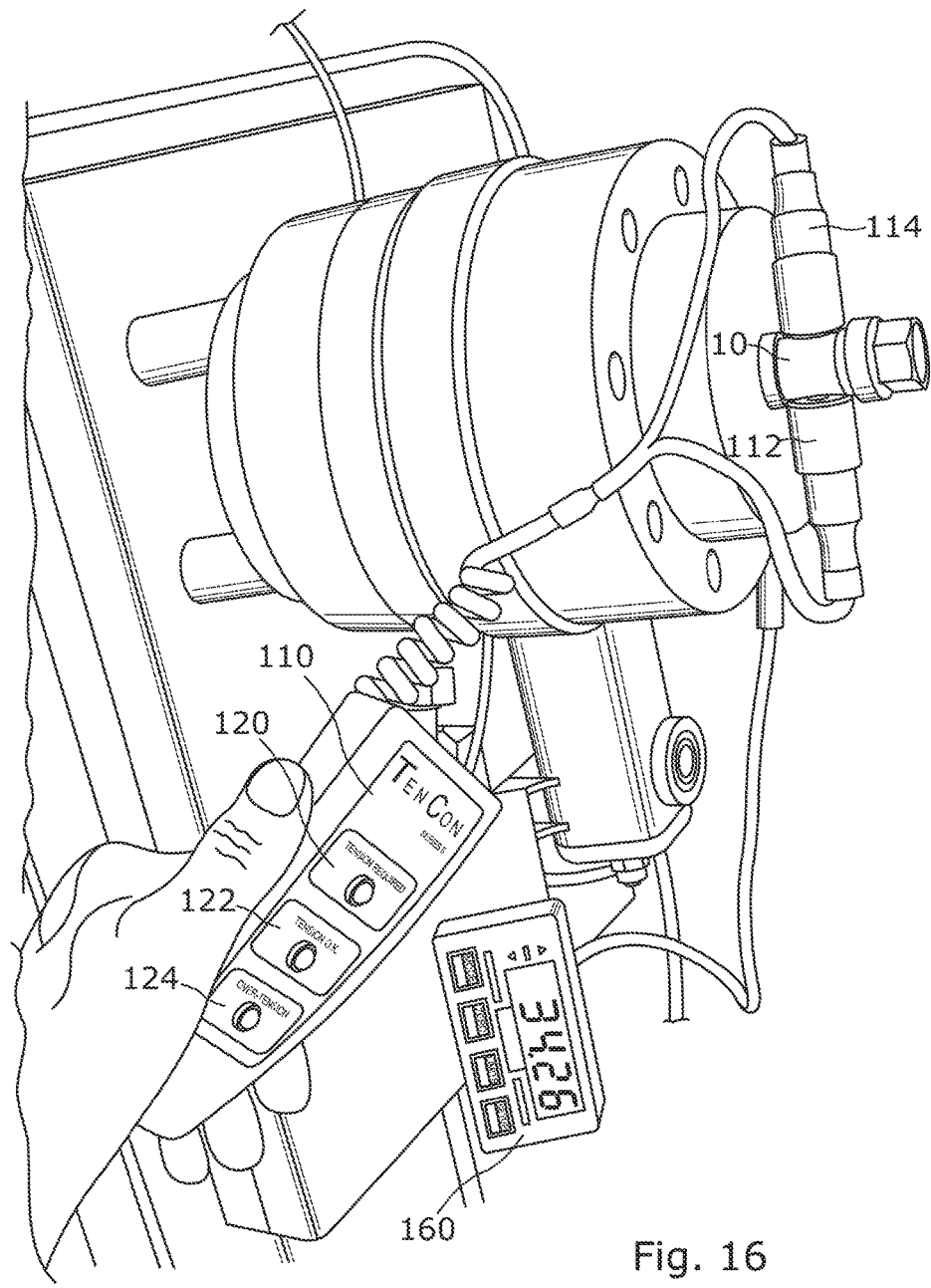

FIG. 16—shows an arrangement of a load-indicating device with a hand-held monitor according to a particularly preferred embodiment incorporating a visual display in the form of a digital readout.

Referring to FIG. 1, there is a shown a particularly preferred embodiment of a load-indicating device 10 according to the present invention. It is to be understood that the device as shown in FIG. 1 is not drawn to scale and therefore the figure is intended for illustrative purposes only.

The device 10 comprises a washer having a tubular body 18, which defines a bore 13 extending therethrough. The device is ideally suited for use when joining two different mechanical assemblies together by way of nuts and bolts etc. and provides an accurate indication of the loading of an assembly when under a compressive load. Materials stretch or compress under load with stress being proportional to strain up to the materials' proof load (Hooke's Law) and if this can be measured it is the most reliable means of determining clamped loads in structural joints.

Under load, the force applied to the body 18 of the washer will be a compressive force and the body will be deflected, i.e. compressed. Based on Hooke's law there is a linear relationship between the deflection compression or extension) of the material of the washer and the force that is applied to it, up to a maximum proof load of the material, whereupon the linear relationship breaks down. Up to this maximum proof load, the material of the washer retains its elasticity, such that after the loading force responsible for compressing the material is removed, the body of the washer will return to its original un-compressed dimensions.

The body 18 of the washer has a height 12 and a thickness 16. In one embodiment, the height 12 of the washer does not vary, but different thicknesses and materials of the washer can be used for different loading requirements. It should be appreciated that in an alternative embodiment, a washer with a different height 12 might be used.

The washer comprises at least one hole 20 in the body of the washer for receiving at least one probe 14 to measure the deflection of the body under load. FIG. 2 shows a side view of a probe 14 that is located within the hole 20 of the body 18 of the washer. In this example the probe 14 is removably disposed within the hole 20 of the washer. In an alternative embodiment, the probe may be a non-removable component of the washer.

FIG. 3 shows a plan view of the body 18 of the washer having a hole 20 for receiving the probe 14 shown in FIG. 2. The body 18 of the washer is shown as having substantially circular dimensions in plan view, but a washer having a different geometry is also possible.

FIG. 4a shows a side cross-sectional view of the washer according to a preferred embodiment. The washer has a first hole 20 and a second hole 21 in the body 18. The body 18 has an upper load-bearing surface 42 and a lower load-bearing surface 42, which will deflect or compress the body 18 of the washer under load.

The washer provides an accurate indication of the compressive force using only one hole. However, in an alternative embodiment a plurality of holes may be distributed around the circumference of the body. This advantageously provides an indication of an even distribution of the loading force around the washer which informs an operator that the mechanical joint is symmetrically loaded.

The second hole 21 has a different (i.e. smaller) diameter to the first hole for indicating an over-load condition. That is, a first probe 14 in the first hole 20 indicates when the force is at the predetermined tension or load, but a second probe in the second hole 21 is used to indicate when the force is in an over-loaded condition.

More specifically, if the first probe 14 when inserted into the first hole 20 is free to rotate via manual manipulation, then an operator knows that the washer is under-load, namely that the predetermined tension has not yet been attained. Therefore, the operator knows that further tightening of the fastening components is required, until such time that the probe can no longer be rotated by finger pressure. In this case, the operator is then able to determine when the predetermined tension has been reached. By using a second hole 21 in the body 18 of the washer, the operator can ascertain whether the joint has been over-loaded, as the second probe will be free to rotate unless the body of the washer has been compressed too far, indicating that the washer has been over-loaded.

The probe or probes can be colour coded for different predetermined loads, so that an operator can select and use the correct probe for the desired load.

FIG. 4b shows an alternative embodiment in which a portion 46, 48 of the body 18 of the washer is reduced in diameter. This reduced diameter portion makes the body 18 of the washer easier to deflect and therefore increases the sensitivity and range of the deflection (and compressive force) being determined.

FIG. 5a shows a load-indicating device 10 in an example bolted joint using a cap screw & nut for tightening the mechanical assembly. A bolt 53 passes through the joint 58, together with the internal bore of the washer, and terminates in a cap screw 52. The head 54 of the bolt 53 can be turned to tighten the entire assembly. In use, the bolt 53 can be tightened by an operator until the load-indicating device 10 indicates that the compressive force has reached the predetermined design load, whereupon the operator will no longer be able to rotate the probe 14 within the hole 20 by manual manipulation, i.e. finger pressure.

FIG. 5b shows a load-indicating device 10 in an alternative bolted joint using a bolt & nut for tightening the assembly. In exactly the same away as above, the operator can continue to tighten the bolt until such time as the probe 14 no longer rotates within the hole 20, whereupon the compressive force has reached the predetermined design load.

FIG. 6 shows another embodiment of a load-indicating device according to the present invention, in which a clock gauge is used to indicate the load on the washer over the range of zero to proof load. A lever 67 disposed within a hole of the body of the washer, rotates around a fulcrum pin and reacts against a compression spring 69 when the washer deforms under load. This action forces a rod 65 to move radially away from the centre of the washer (i.e. in a vertical direction in FIG. 6). The rod 65 moves the probe 64 which in turn actuates the gauge 62, via a spring 66 and stem 64 mechanism. The gauge 62 is calibrated to indicate the load on the washer.

Referring to FIG. 7, there is shown a plurality of curves illustrating Hooke's law for different washer materials. The x-axis indicates the extension (or compression) of the material, while the y-axis indicates the loading force. A first curve 70 indicates a material with a proof load of grade 8.8, second curve 72 represents a material with a proof load of grade 10.9 and third curve 74 represents a material with a proof load of grade 12.9. It can be seen than in the elastic region each of the curves 70, 72 and 74 indicate a linear (directly proportional) relationship between the compressive deflection of the material and the loading force, but each of the materials has a proof load, whereupon Hooke's law breaks down and a non-linear relationship results.

FIG. 8 shows an alternative embodiment in which the load-indicating device forms part of an electrical circuit. In this arrangement the probe 14 acts as an electrode having at least a portion of its length sheathed in an insulating material, such as plastic or rubber etc. The probe 14 is dimensioned such that a small air gap exists between the outer surface of the shank 81 of the probe and the interior walls of the hole 20. The walls of the hole 20 serve as the other electrode in the electrical circuit. The insulation is arranged to deflect when the body of the washer is under load, such that the shank 81 of the probe 14 comes into physical and electrical contact with the walls of the hole 20. A light source 82, which can be a filament bulb or LED etc. forms part of the electrical circuit. Therefore, when the washer is loaded to the predetermined tension, the probe and the hole are electrically connected enabling the light source 82 to be illuminated. As a result, the operator can then be made aware of the correct loading by way of a visual indication, namely the illumination of the light source 82. A cell or battery 84 provides power for the electrical circuit.

It is to be appreciated that in alternative embodiments, the interior of the hole may be insulated instead of the probe, and therefore either arrangement may form part of the present invention.

In FIGS. 9a-d there is shown another electrical implementation of the load-indicating device of the present invention. Referring to FIG. 9a, there is shown a washer under load with a probe or Rota 92 inserted into a hole of the body 18 of the washer. The body 18 also comprises an adjustment control pin 96, which is connected to an upper load-bearing surface of the washer. A clamping screw 98 (shown in FIGS. 9b & 9c) is used to adjust the position of the control pin. A rota retention pin 94 retains the probe 92 in position within the hole of the body 18 of the washer.

FIG. 9d shows a magnified view of a portion of the washer, showing the probe and pins in more detail. The adjustment control pin 96 extends downwardly from the upper load-bearing surface 42. An air gap 97 is present between the tip of the control pin 96 and a first layer of electrical insulation 93 covering at least a portion of the length of the probe 92. Under load, the upper load bearing surface will be deflected due to the compressive tightening force, allowing the tip of the pin 96 to be forced down into the air gap 97 and through the insulating material 93 to make electrical contact with the shank of the probe 92. Therefore by carefully selecting the size of the air gap and the dimensions of the probe and hole etc. the electrical circuit can be configured to illuminate a LED etc. when the predetermined loading force has been reached.

FIGS. 10a and 10b show a further electrical implementation of the load-indicating device of the present invention. The structure and function of this embodiment is similar to that of FIGS. 9a-d.

Referring to FIG. 11a, there is shown another preferred embodiment of the load-indicating device according to the present invention. In this embodiment, the device comprises a hand-held monitor 110 which is intended to be portable and used remotely from the device. As shown, the device comprises two probes 14, one for indicating correct loading (i.e. at the predetermined tension) and another for indicating an over-load condition. The probes 14 are protected by respective protective caps 117 to prevent damage to the ends of the probes when the device is not in use.

The hand-held monitor 110 may be used to indicate the load on any grade or size of bolt or stud etc. and therefore this embodiment is inherently scalable. Three LEDs are provided in the monitor 110, each ideally being of a different colour. For example in the embodiment of FIG. 11a, a red LED 120 is provided to indicate an under-loading condition, in which further tightening of the fastening components would be required. A green LED 122 is provided to indicate that the correct loading has been attained, namely that the washer has reached the predetermined tension; while a yellow LED 124 is provided to indicate that an overloaded condition has occurred, requiring the operator to loosen the fastening components due to over tensioning of the components. Of course, any arrangement of LEDs and colours thereof may be used to indicate the various loading conditions, and indeed other display devices (e.g. LED matrices, LCDs etc.) may alternatively or additionally be used to convey loading information to an operator. Moreover, an audible indicator may also be used to provide a sound signal or tone to the operator, which could be modulated depending on the loading of the washer.

As shown in FIGS. 11a & 11b, the hand-held monitor 110 is connected to the probes 14 via connectors 112 and 114 on respective ends of electrical extension leads. The leads can be of any required length, with helical (coil) leads being preferred, as these permit the leads to extend as necessary. The connectors 112, 114 are simply 'push-fit' onto the ends of the probes 14 once the protective caps 116 and 117 have been removed, as shown in FIG. 11b.

FIGS. 12a-12c show the connectors 112, 114 in more detail. Referring to FIG. 12a, the connector 112 comprises magnets 121 that are magnetically attracted to the body of the washer to enable the contact 112 to remain in place after it has been pushed onto the end of the probe 14.

In another embodiment as shown in FIG. 13, the load-indicating device can be configured to automatically interrupt the power to a power tool 130 that is being used to tighten the fastening components. In this example, the monitor 110 comprises an output port operable to send an interrupt signal along connection 134 to a solenoid valve or rely 132 when the predetermined tension has been reached. The power tool 130 may be purely electrical or may be an air tool, which operates via compressed air, or may be both.

Therefore, the solenoid valve 132 may also, or alternatively, be used to control the air flow to the power tool 130 while tightening the fastening components. Probe 136 is operable to send an electrical signal indicative of the load on the washer along lead 138 to the monitor 110. Once the correct predetermined tension has been reached, an output signal is sent to the solenoid valve 132 to interrupt the power tool, thereby preventing an over-load condition from arising.

Instead of a hand-held monitor, the load-indicating device may be connected to a computer for monitoring and displaying the load on the washer. As shown in FIG. 14, computer 140 comprises processors 142 and 144 that are arranged to receive data from respective load-indicating devices. This implementation is particularly advantageous for use in environments that are potentially hazardous or are otherwise difficult to operate in, for example marine environments or nuclear reactor cores etc. Wired connections or fibre optic cables may be permanently connected to the probes of all of the devices for real-time monitoring of the respective loading conditions.

Although the washer of the present device is ideally suited for deployment between two fastening components, it is envisaged that the load-indicating device may alternatively be integrated into one or more of the fastening components themselves. Therefore, as shown in the example of FIGS. 15a & 15b, the 'washer' has been integrated into the body of a hexagonal nut, with the interior bore of the washer being threaded. Of course, any form of fastening component may be used and therefore the present device may be integrated into any nut or bolt type, or joint assembly etc., depending on the particular requirements and application.

FIG. 16 shows a further embodiment of the hand-held monitor implementation, in which an output of the monitor 110 can be connected to a digital readout display 160 or similar, to provide a more quantitative measure of the loading force on the washer.

As will be appreciated from the foregoing embodiments, the present invention is able to provide a simple, easy to fit, and cost-effective means of indicating accurate loading of a mechanical assembly. Therefore, although the load-indicating device is ideally suited for ensuring a reliable and consistent tensioning of fastening components, it will be recognised that one or more of the principles of the invention may extend to other fastening or securing applications, whereby it is required to tension or load a mechanical connection to an accurate predetermined value or tolerance.

The above embodiments are described by way of example only. Many variations are possible without departing from the invention.

The invention claimed is:

1. A load-indicating device, comprising:
   a washer having a tubular body defining a bore extending therethrough, the body comprising at least one radial hole extending at least partially through the body in a direction perpendicular to the axis of the bore; and
   a probe configured to be disposed within the at least one radial hole in a direction perpendicular to the axis of the bore and operable to provide an indication of the compression on the washer, such that, in use, the washer deflects to compress the radial hole against the probe when the load on the washer reaches a predetermined tension, and wherein the probe is free to move within the radial hole until the load on the washer reaches the predetermined tension.

2. The device of claim 1 wherein the deflection of the washer is configured to bring at least one side wall of the hole into contact with an outer surface of the probe.

3. The device of claim 1, wherein the probe is an elongate pin.

4. The device of claim 1, wherein a portion of the body has a relatively narrower diameter than the remainder of the body.

5. The device of claim 1, wherein the body comprises upper and lower load-bearing surfaces.

6. The device of claim 1, wherein the probe is either mechanically or electrically connected to a visual display device to provide a visual indication of the loading on the washer.

7. The device of claim 6, wherein the visual display device is a rotary gauge operably connected to the probe via a mechanical lever.

8. The device of claim 1, wherein the body and the probe form part of an electrical circuit which is configured to permit the flow of current when the load on the washer reaches the predetermined tension.

9. The device of claim 8, wherein the probe is in the form of an electrode.

10. The device of claim 9, wherein the electrical circuit further comprises a plurality of light sources operable to indicate at least one of: an under-loading condition, an over-loading condition and a design loading condition.

11. The device of claim 8, wherein at least a portion of the probe is electrically insulated.

12. The device of claim 11, wherein the electrical circuit further comprises a plurality of light sources operable to indicate at least one of: an under-loading condition, an over-loading condition and a design loading condition.

13. The device of claim 8, wherein the electrical circuit comprises at least one light source that is operable to illuminate in response to the flow of current.

14. The device of claim 13, wherein the electrical circuit further comprises a plurality of light sources operable to indicate at least one of: an under-loading condition, an over-loading condition and a design loading condition.

15. The device of claim 8, wherein the electrical circuit further comprises a plurality of light sources operable to indicate at least one of: an under-loading condition, an over-loading condition and a design loading condition.

16. The device of claim 15, wherein the plurality of light sources are disposed in a hand-held device configured to be used remotely from the load-indicating device.

17. The device of claim 15, wherein the body further comprises a second hole extending at least partially through the body and configured to receive a second probe.

18. The device of claim 1, wherein the body further comprises a second radial hole extending at least partially through the body and configured to receive a second probe.

19. The device of claim 18, wherein the second probe is operable to provide an indication of an over-loading condition on the washer.

* * * * *